United States Patent [19]
Yamamoto

[11] Patent Number: 5,629,590
[45] Date of Patent: May 13, 1997

[54] ROTATIONAL DRIVE CONTROL DEVICE FOR VARIABLE SPEED DRIVE MOTOR

[75] Inventor: Michio Yamamoto, Foothill Ranch, Calif.

[73] Assignee: Futaba Denshi Kogyo Kabushiki Kaisha, Mobara, Japan

[21] Appl. No.: 137,912

[22] Filed: Oct. 19, 1993

[51] Int. Cl.$^6$ ............................................ H02P 5/34
[52] U.S. Cl. .................... 318/16; 318/803; 388/933
[58] Field of Search ........................ 388/824, 811, 388/809, 815; 318/663, 446, 649, 587, 16, 269, 802, 803, 800, 933

[56] References Cited

U.S. PATENT DOCUMENTS

| | | | |
|---|---|---|---|
| 4,143,307 | 3/1979 | Hansen | 318/269 |
| 4,596,049 | 6/1986 | Rizzotti, III | 455/603 |
| 4,665,489 | 5/1987 | Suzuki et al. | 318/587 |
| 4,736,148 | 4/1988 | Hirata | 318/803 |
| 4,904,916 | 2/1990 | Gisske et al. | 318/649 |
| 4,958,117 | 9/1990 | Kerkman et al. | 318/803 |
| 4,959,602 | 9/1990 | Scott et al. | 318/803 |
| 4,976,552 | 12/1990 | Ishikawa et al. | 388/824 |
| 5,041,825 | 8/1991 | Hart et al. | 318/16 |
| 5,065,078 | 11/1991 | Nao et al. | 388/829 |
| 5,117,900 | 6/1992 | Cox | 454/256 |
| 5,189,412 | 2/1993 | Mehta et al. | 340/825.22 |
| 5,345,504 | 9/1994 | West, Jr. | 455/246.1 |
| 5,348,078 | 9/1994 | Dushane et al. | 236/49.3 |
| 5,390,206 | 2/1995 | Rein et al. | 236/51 |

*Primary Examiner*—John W. Cabeca
*Attorney, Agent, or Firm*—Oblon, Spivak, McClelland, Maier & Neustadt, P.C.

[57] ABSTRACT

A rotational drive control device for a variable sp drive motor capable of accomplishing radio transmission of a signal for VSD (Variable Speed Drive) rotational drive control of a variable speed drive motor arranged in a rotational drive system of any equipment to be controlled in a factory or the like according to a radio communication system. The variable speed drive motor is arranged on a controlled side. On a control side, commercial AC power is converted into DC power and then converted into AC power of a frequency selected in accordance with a desired drive control to be imposed on the motor, to thereby obtain an AC rotational drive control signal due at the selected frequency, thereby to carry out rotational drive control of the variable speed drive motor, such as a control operation of changeover between normal rotation of the variable speed drive motor and reverse rotation thereof, a control operation of a rotational speed of each of the normal rotation and reverse rotation, a stop control operation or the like. Transmission of the rotational drive control signal of the predetermined frequency from the control side to the variable speed drive motor is carried out according to a spectrum spread communication system.

7 Claims, 4 Drawing Sheets

ROTATIONAL DRIVE CONTROL DEVICE FOR VARIABLE SPEED DRIVE MOTOR

BACKGROUND OF THE INVENTION

This invention relates to a rotational drive control device for a variable speed drive motor arranged in a rotational drive system of any concerned equipment in a factory or the like, and more particularly to a rotational drive control device for a variable speed drive motor which is adapted to carry out rotational drive control of the variable speed drive motor according to a radio communication system.

Conventionally, a variable speed drive control system (hereinafter referred to as "VSD control system") has been generally known to those skilled in the art in connection with rotational drive control for a variable speed drive motor and, in particular, rotational speed control therefor.

Such a VSD control system for a variable speed drive motor permits rotational drive control of the variable speed drive motor to be highly smoothly executed over a wide rotational speed range extending from a low rotational speed to a high rotational speed, to thereby significantly reduce power consumption of the motor. Thus, the system tends to be widely applied to rotational drive speed control for a variable speed drive motor constituting a rotational drive system of any desired equipment such as an FA device, a belt conveyor, a crane, a water cooler, a pump or the like in a concerned factory or the like.

Rotational speed control of the variable speed drive motor utilizing the VSD control system is carried out, as a principle, by rectifying and smoothing commercial AC power for rotational drive of a three-phase induction motor used as the variable speed drive motor to be controlled to convert it into DC power and converting the converted DC power into AC power of a frequency required for rotational drive control of the variable speed drive motor again, to there by obtain drive power.

In the stage of converting the DC power to the AC power again, an electrical circuit is used to obtain AC power of any desired frequency, so that it is possible to readily attain smooth rotational drive control of the variable speed drive motor over a wide rotational speed range extending from a lower rotational speed to a high rotational speed as described above.

The VSD control system is used in various manners extending from rotational drive control carried out while individually controlling variable speed drive motors to that carried out while centralizedly controlling a plurality of variable speed drive motors.

For example, a control signal generated from a detection sensor for temperature monitor control or the like may be input to the variable speed drive motor in conformity to a control signal of a rotational speed input thereto, to thereby accomplish whole process control for a rotational drive system of any desired equipment.

In such applications of the VSD control system, the control may be carried out through a control panel equipped in an equipment which is desired to be subject to control. In this instance, it is required to carry out centralized control, remote control or the like, therefore, the equipment generally includes input terminals for receiving control signals from an exterior thereof. Thus, the control is carried out depending on input of each of the external control signals thereto. For this purpose, for example, a voltage signal of about 0 to 10 V or a current signal of 4 to 20 mA is generally used as an analog signal for the rotational speed control.

When centralized control of the variable speed drive motors of the rotational drive system is to be carried out; it is required that a signal transmission cable is laid between a centralized control center and each of equipments of a VSD system to be controlled for remote control therebetween, so that a VSD control signal, as well as a sensor control signal or the like as required is transmitted according to a wire communication system.

However, in control of a rotational drive speed of the variable speed drive motor carried out using the VSD control system as described above, the control signal is transmitted according to the wire communication system. Unfortunately, this leads to the following disadvantages.

One of the disadvantages is that laying of the signal transmission cable between the centralized control center and each of equipments to which control of the VSD control system is to be applied causes a significant increase in cost.

Another disadvantage is that an increase in cost due to laying the signal transmission cable between the centralized control system and the equipment imposes restrictions on and/or deteriorates flexibilities such as arrangement of the equipment, lay-out thereof, relocation thereof, and the like.

A further disadvantage is that when laying of the signal transmission cable is impossible from positional and/or physical points of view, application of the VSD control system is substantially restricted.

Still another disadvantage is that when the equipment which is to be subject to control according to the VSD control system is located far away from a control section thereof, it is highly difficult and troublesome to carry out maintenance thereof.

It would be considered that a radio communication system is employed for transmission of the signal in order to eliminate the above-described disadvantages. Unfortunately, a radio system by means of a conventional regular communication system causes an environment surrounding the equipment to which control according to the VSD control system is applied to be ruined due to generation of noise from the equipment, resulting in being substantially impossible to be realized.

SUMMARY OF THE INVENTION

The present invention has been made in view of the foregoing disadvantages of the prior art.

Accordingly, it is an object of the present invention to provide a rotational speed control device for a variable speed drive motor which is capable of permitting a VSD control system by a radio communication system to be applied thereto while preventing an environment surrounding an equipment to which the VSD control system is applied from being deteriorated by the equipment.

It is another object of the present invention to provide a rotational speed control device for a variable speed drive motor which is capable of employing a radio communication system resistant to a deteriorated environment generating noise in place of a wire communication system, to thereby eliminate a necessity of laying a signal transmission cable between a centralized control center and an equipment to which a VSD control system is applied.

In accordance with the present invention, a rotational drive control device for a variable speed drive motor is provided. The rotational drive control device includes a controlled side provided with a variable speed drive motor to be controlled which is arranged in a rotational drive system of any equipment concerned in a factory or the like, and a control side on which commercial AC power is converted into DC power and then converted into AC power of a predetermined frequency required, to thereby obtain an AC rotational drive control of the predetermined frequency, resulting in carrying out rotational drive control of the variable speed drive motor at the control side such as a control operation of change-over between normal rotation of the variable speed drive motor and reverse rotation thereof, a control operation of a rotational speed of each of the normal rotation and reverse rotation, a stop control operation or the like. The control side is provided with a transmission section for transmitting the rotational drive control signal by radio transmission and the controlled side is provided with a receiver section for receiving the rotational drive control signal from the control side by radio receiving, wherein the radio transmission of the rotational drive control signal of the predetermined frequency for the variable speed drive motor from the transmitter section on the control side to the receiver section on the controlled section is carried out according to a spectrum spread communication system.

In a preferred embodiment of the present invention, a plurality of the controlled sides are arranged.

In a preferred embodiment of the present invention, a plurality of the controlled sides are arranged and a plurality of the variable speed drive motors are arranged on each of the controlled sides.

In a preferred embodiment of the present invention, a plurality of the controlled sides are arranged, wherein specified one of the controlled sides is provided with a receiver section for receiving the rotational drive control signal from the control side by radio receiving and a relay transmission section, the controlled side other than the specified controlled side is provided with a relay receiver section for receiving the rotational drive control signal through the relay transmitter section on the specified controlled side from the control side, the transmitter section on the control side carries out radio transmission of the rotational drive control signal to the receiver section on the specified controlled side, and the specified controlled side carries out relay radio transmission of the rotational drive control signal received from the control side through the relay transmission section to the relay receiver section on the controlled side other than the specified controlled side.

In a preferred embodiment of the present invention, the rotational drive control signal contains an external control signal directly related to the controlled side.

In a preferred embodiment of the present invention, the relay transmitter section on the specified controlled side is provided with an external input terminal to which an external control signal directly related to the controlled side other than the specified controlled side is input.

In a preferred embodiment of the present invention, the spectrum spread communication system is a spectrum spread frequency hopping system.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Now, a rotational drive control device for a variable speed drive motor according to the present invention will be described hereinafter with reference to the accompanying drawings.

The present invention, as described above, is adapted to significantly utilize a conventional VSD control device for the purpose of carrying out rotational drive control of a variable speed drive motor, to thereby carry out radio control of the VSD control device according to a spectrum spread communication system exhibiting excellent resistance to a deteriorated environment which generates noise.

Figure 1:
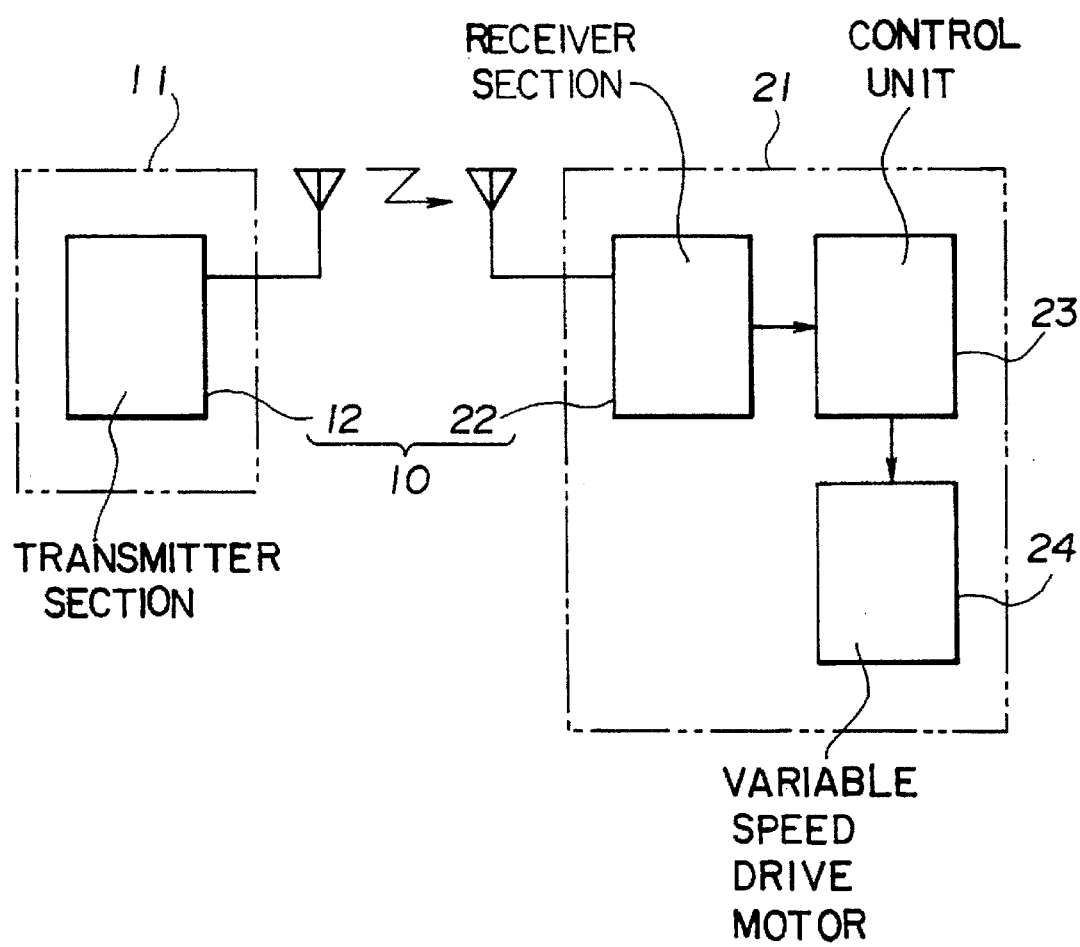
FIG. 1 is a schematic view generally showing an embodiment of a rotational drive control device for a variable speed drive motor according to the present invention.
Figure 2:
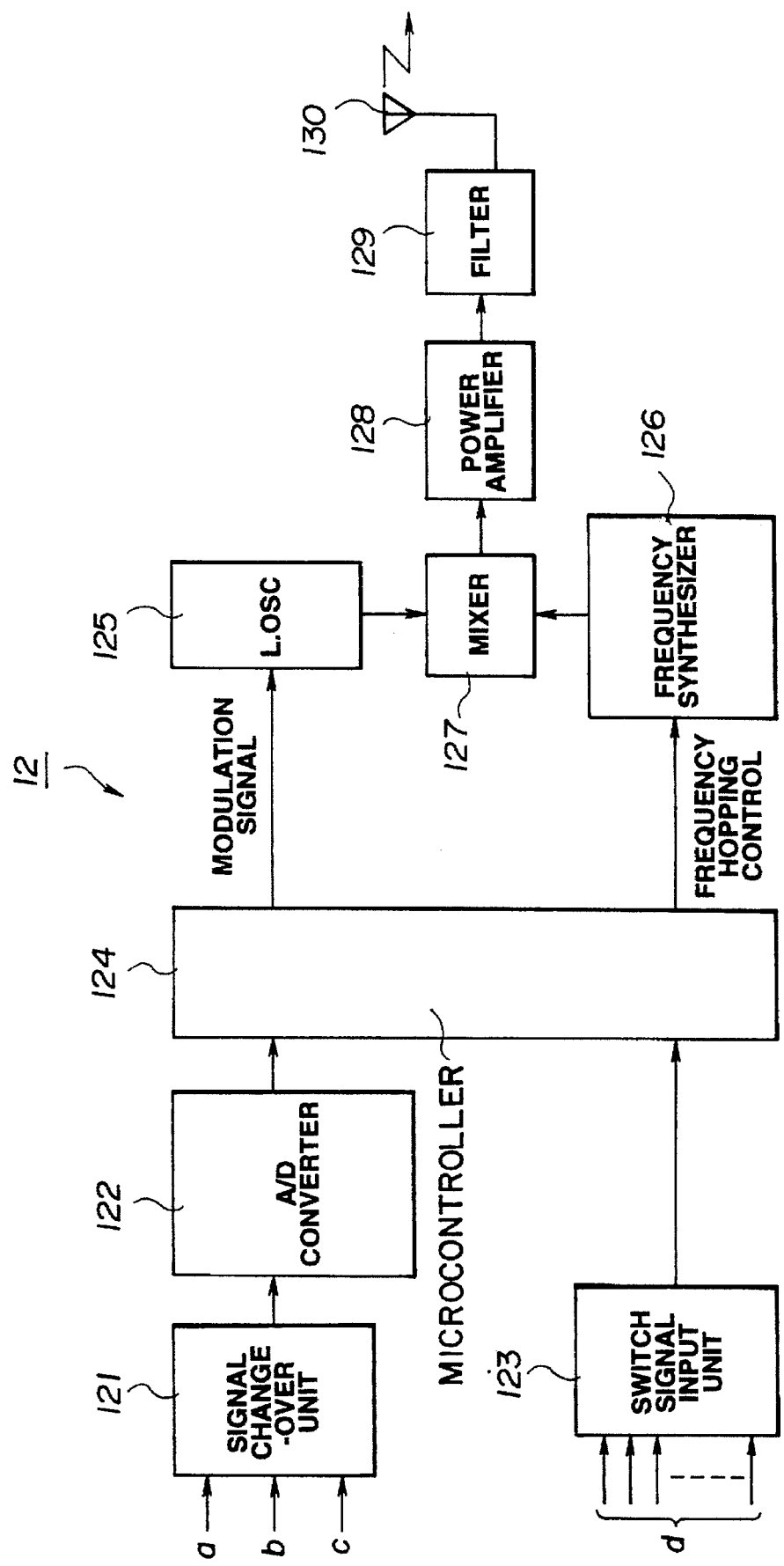
FIG. 2 is a block diagram showing an example of a circuit of a transmitter section on a control side of the rotational drive control device shown in FIG. 1.
Figure 3:
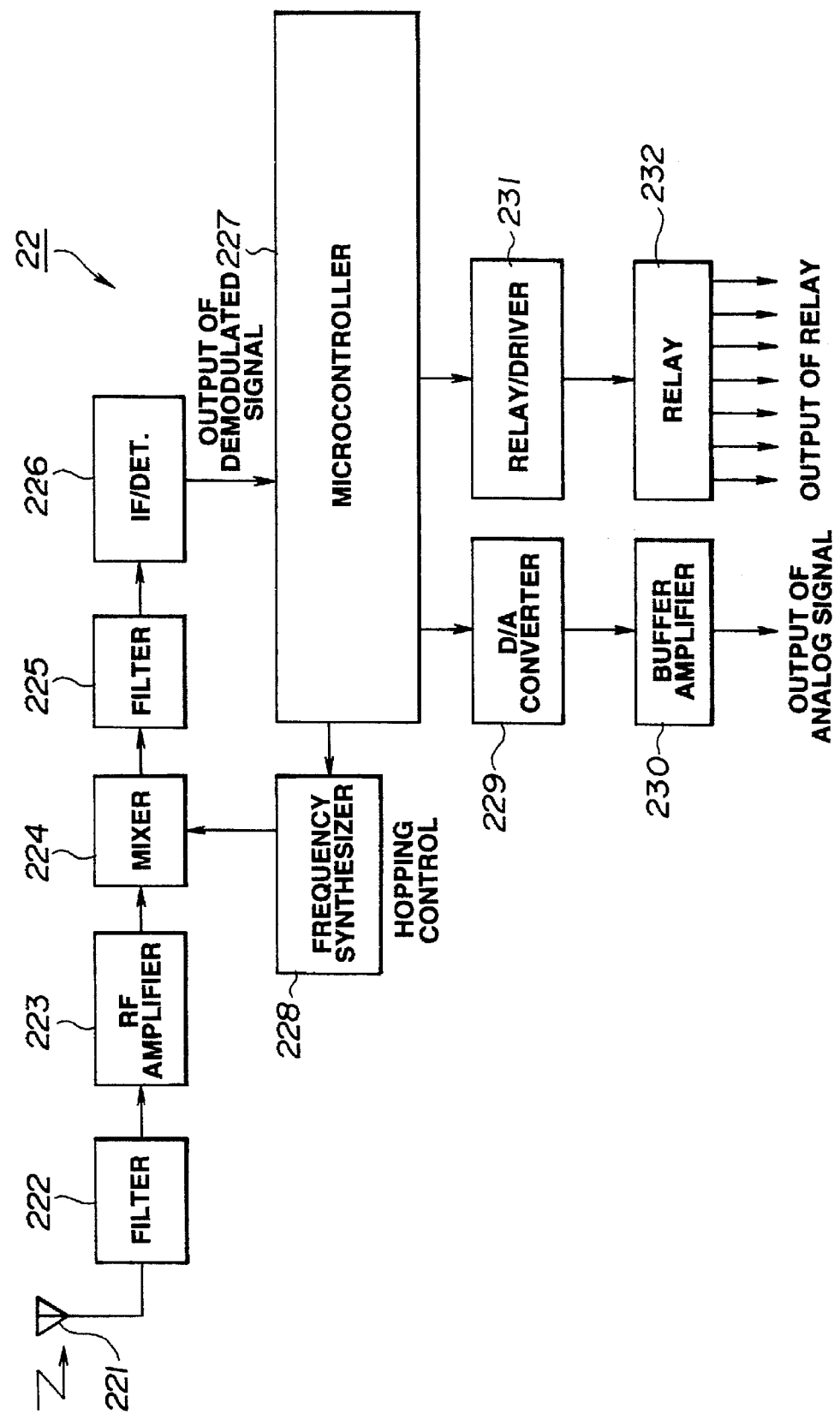
FIG. 3 is a block diagram showing an example of a circuit of a receiver section on a controlled side of the rotational drive control device shown in FIG. 1.

Referring first to FIGS. 1 to 3, a first embodiment of a rotational drive control device for a variable speed drive motor according to the present invention is illustrated.

A rotational drive control device of the illustrated embodiment, as shown in FIG. 1, includes a VSD radio communication unit 10 employing a spectrum spread communication system. The VSD radio communication unit 10 includes a transmitter section 12 for radio transmission of a drive control signal which is arranged on the side of a centralized control center of a factory or the like to which the VSD control system is applied and a receiver section 22 for receiving the drive control signal which is arranged on the side of an equipment 21 to which the VSD control system is to be applied. The centralized control center is arranged on a control side and is normally one in number and the equipment 21 is arranged on a controlled side and is normally at least one in number.

The VSD radio communication unit 10 is adapted to carry out radio transmission of a rotational drive control signal of a predetermined frequency according to a spectrum spread communication system to the variable speed drive motor to be controlled which is arranged on the equipment 21 to which the VSD control system is to be applied. The variable speed drive motor to be controlled is at least one in number. A frequency band to be used may be, for example, 900 MHz/ISM band permitted by Federal Communications Commission (FCC) and spread to be 902 to 928 MHz by signal spread according to a frequency hopping system.

The equipment 21 to which the VSD control system is to be applied is provided with a VSD control unit 23 to which control signals received by the receiver section 22 are input. The VSD control unit 23 is adapted to carry out control operations such as a control operation of change-over between normal rotation of a variable speed drive motor 24 to be controlled which is arranged on a rotational drive system (not shown) in the equipment 21 to which the VSD control system is to be applied and reverse rotation thereof, a control operation of a rotational speed of each of the normal and reverse rotations of the variable speed drive motor 24, a stop control operation and the like, as well as control operations attendant on the above-described operations such as reset, jog, emergency stop and the like. The number of variable speed drive motors to be controlled, as described above, is one or more.

In the rotational drive control device of the illustrated embodiment, the transmitter section 12 arranged in the centralized control center 11 on the control side of the VSD radio communication unit 10, as shown in FIG. 2, includes a signal change-over unit 121 to which, for example, signals generated from a trimmer arranged on a transmitter panel and signal terminals arranged on a transmitter casing are input. The signals include a manual rotational speed setting signal a, an external voltage signal b of, for example, about 0 to 10 V containing any desired control signals and an external current c of, for example, about 4 to 20 mA. The signal change-over unit 121 functions to change over any one of the signals depending on applications of the rotational drive control device and then feed it to an A/D converter 122 provided subsequent to the signal change-over unit 121. The A/D converter 122 converts the signal into a digital signal of, for example, 12 bits, which is then input to a microcontroller circuit 124.

Also, control operation signals for drive control of the trimmer arranged on the transmitter panel such as rotational drive, rotation stop, reset, normal/reverse rotation, jog, emergency stop or the like each constituting an operation switch signal d which is a digital signal are input through a switch signal input unit 123 to the microcontroller circuit 124.

Then, any one of the digital signals a to c input to the microcontroller circuit 124 and the digital signal d are converted into serial data (for example, 2400 bps) which can be transmitted by radio transmission through the microcontroller circuit 124 and then input in the form of a modulation signal to an oscillator (L/OSC) 125, followed by being exposed to FSK modulation through the oscillator 125.

Further, in order to realize frequency hopping, a frequency setting signal is input from the microcontroller 124 to a frequency synthesizer 126 according to a predetermined hopping sequence, so that the frequency synthesizer 126 carries out frequency change-over at a predetermined time interval of, for example, 30 msec, to thereby output a desired frequency, which, in the illustrated embodiment, is of 819 to 945 MHz.

The signals thus output which include the output signals of the oscillator 125 and synthesizer 126 are subject to frequency mixing in a mixer 127, to thereby provide a desired rotational drive control signal by the frequency hopping. In the illustrated embodiment, a frequency of the control signal is 902 to 928 MHz. Subsequently, the rotational drive control signal is subject to power amplification in a power amplifier 128 and then fed through a band-pass filter 129 to a transmitting antenna 130, followed by being output in the form of a beam from the transmitting antenna 130.

Now, the receiver section 22 arranged on the equipment 21 on the controlled side to which the VSD control system is to be applied will be described, by way of example, with reference to the case that a double super heterodyne system is used for a high frequency section. In the receiver section 22, as shown in FIG. 3, the rotational drive control signal by frequency hopping is received by a receiving antenna 221 and passed through a band-pass filter 222, followed by being subject to signal amplification in a high-frequency amplifier 223. Then, it is subject to frequency conversion with a signal output from a frequency synthesizer 228, resulting in a primary intermediate frequency signal being provided. The rotational drive control signal, as described above, is subject to frequency hopping; therefore, in order to obtain a predetermined primary intermediate frequency signal, it is required that a frequency output from the frequency synthesizer 228 is synchronized with a hopping sequence on the side of the transmitter section 12.

In the illustrated embodiment, control for such synchronism is carried out through a microcontroller circuit 227. The microcontroller circuit 227 constantly monitors the synchronism, to thereby feed the frequency synthesizer 228 with an appropriate frequency setting signal. Also, under the conditions that such synchronism of the frequency hopping is kept, the mixer 224 outputs a predetermined primary intermediate frequency signal, which is guided to a band-pass filter 225 of the next stage and then subject to signal demodulation through a secondary intermediate frequency conversion wave detector 226. In the illustrated embodiment, the predetermined primary intermediate frequency signal has a frequency of 83 MHz.

The demodulated signal described above or the concerned rotational drive control signal demodulated is then input to the microcontroller circuit 227, in which decode of each of analog control signal data and VSD operation switch control signal data is carried out.

Subsequently, the analog control signal data decoded or digital data for setting rotational drive control of the variable speed drive motor are input to a D/A converter 229, to thereby be converted into an analog signal corresponding thereto again. The signal is then amplified through a buffer amplifier 230 and then input to each of input terminals of the VSD control unit 23 for setting the rotational drive control, resulting in rotational drive control required being carried out with respect to the variable speed drive motor 24. Also, the VSD operation switch control signal data are input to a relay/driver circuit 231 to operate a relay circuit 232 in correspondence to the abovedescribed operation on the side of the transmitter section 12. An output of the relay circuit 232 is input to each of the input terminals of the VSD control unit 23, resulting in control operation required being carried out with respect to the variable speed drive motor 24.

Figure 4:
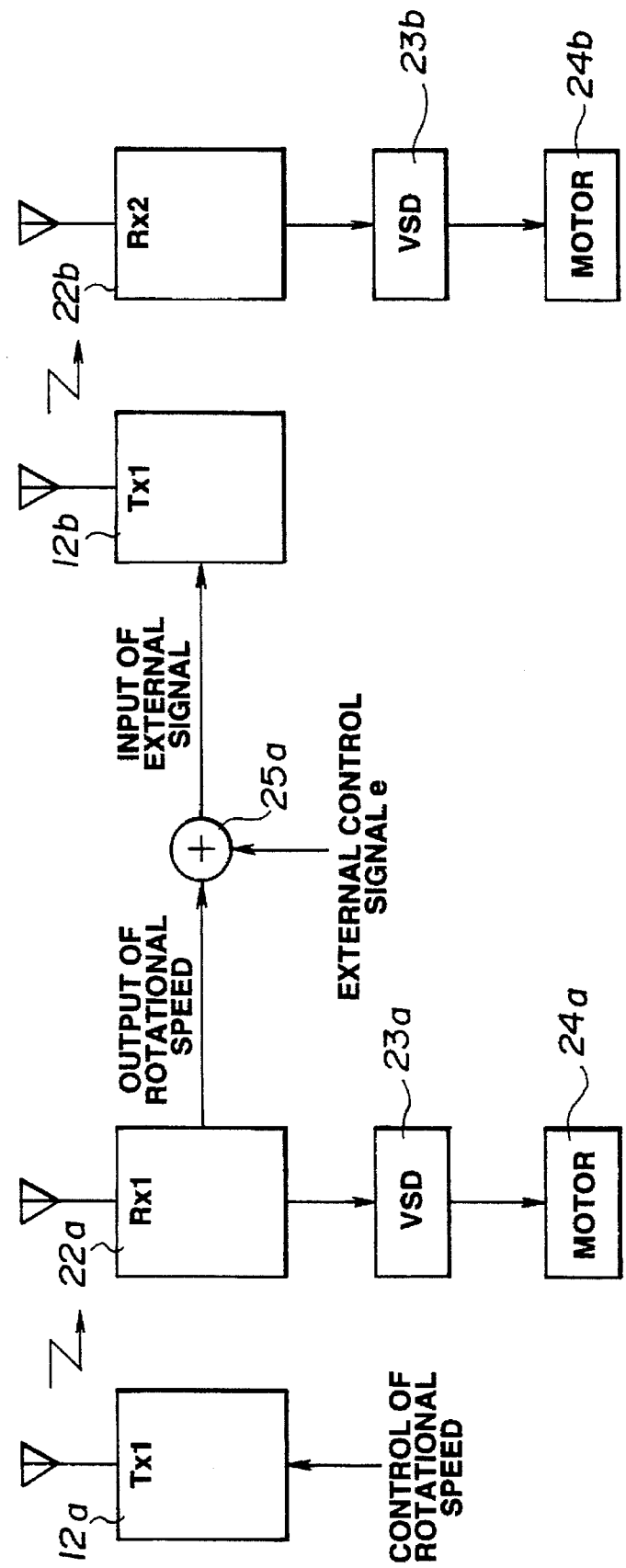
FIG. 4 is a schematic view generally showing another embodiment of a rotational drive control device for a variable speed drive motor according to the present invention.

Referring now to FIG. 4, a second embodiment of a rotational drive control device for a variable speed drive motor according to the present invention is illustrated.

A rotational drive control device of the second embodiment shown in FIG. 4 includes a transmitter section 12a for transmitting a rotational drive control signal by radio transmission, which transmitter section is arranged and constructed in substantially the same manner as the transmitter section 12 arranged in the centralized control center 11 acting as the control side in the first embodiment described above. Also, the rotational drive control device of the illustrated embodiment includes a receiver section 22a for receiving a rotational drive control signal from the transmitter section 12a and a relay transmitter section 12b for radio relay of the rotational drive control signal. The receiver section 22a may be arranged in substantially the same manner as the receiver section 22 arranged in at least one equipment 21 in the first embodiment described above and the relay transmitter section 12b is constructed in a manner corresponding to the above-described transmitter section 12. Further, the rotational drive control device of the illustrated embodiment includes a VSD control unit 23a to which control signals received are input in such a manner as described above and at least one variable speed drive motor 24a controlled by the VSD control unit 23a. Moreover, the device of the illustrated embodiment may include, as required, an external input terminal 25a provided in the middle of a path to the relay transmission section 12b or in the relay transmission section 12b, so that any additional required external control signal may be added to rotational drive control signal relayed, as in input of the external control signal in the transmission section 12 of the first embodiment.

Also, with respect to at least one equipment 21 to which a VSD control system is to be applied and which is arranged on a controlled side other than a controlled side specified, a relay receiver section 22b for receiving a rotational drive control signal by radio receiving is arranged so as to receive the rotational drive control signal relayed through the relay transmitter section 12b. Likewise, a VSD control unit 23b to which control signals received by relay are input and at least one variable speed drive motor 24b controlled by the VSD control unit 23b are arranged.

Thus, in the second embodiment, a rotational drive control signal transmitted from the transmitter section 12a of the centralized control center 11 on the control side by radio transmission is received by the receiver section 22a on the controlled side specified, to thereby carry out rotational drive control of the corresponding variable speed drive motor 24a. Concurrently, as required, any additional external control signal input through the external input terminal 25a is added to the rotational drive control signal received, which is then transmitted from the relay transmitter section 12b to the relay receiver section 22b on the controlled side other than the controlled side specified, resulting in synchronous rotational drive control of the variable speed drive motor 24a on the controlled side specified and the variable speed drive motor 24b on the controlled side other than the controlled side specified being attained, for example, under predetermined conditions.

As can be seen from the foregoing, the rotational drive control device of the present invention is so constructed that the variable speed drive motor on the controlled side which is arranged in the rotational drive system of the equipment to which the VSD control system is to be applied is fed with commercial AC power, which is converted into DC power and then converted into AC power of a predetermined frequency required again. Thus, when a rotational drive control signal due to the AC power of the predetermined frequency carries out rotational drive control such as a control operation of change-over between normal rotation of the variable speed drive motor and reverse rotation thereof, a control operation of a rotational speed of each of the normal rotation and reverse rotation, a stop control operation or the like, transmission of the rotational drive control signal of the predetermined frequency to the variable speed drive motor from the control side is carried out according to a spectrum spread communication system. Therefore, the present invention does not require any signal transmission cable unlike the conventional wire communication system, to thereby eliminate disadvantages attending on laying or arrangement of the signal transmission cable. Also, the above-described construction of the present invention facilitates maintenance of the units constituting the rotational drive control device such as repairing of the units, adjustment thereof or the like and prevents deterioration of an environment due to generation of noise by an equipment which is to be controlled. Thus, it will be noted that the present invention ensures signal transmission with high reliability.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A rotational drive control system for a variable speed drive motor, comprising:

a control side including a transmitter section for transmitting a rotational drive control signal for the drive motor by radio transmission; and a controlled side including (a) a receiver section for receiving the rotational drive control signal from said control side by radio receiving, (b) means for converting AC power into DC power and then converting the DC power into AC power of a predetermined frequency in accordance with a desired drive control to be imposed on said motor thereby to obtain an AC rotational drive control signal of the predetermined frequency, and (c) a variable speed drive motor to be controlled;

wherein radio transmission of the rotational drive control signal from said transmitter section of said control side to said receiver section on said controlled side is carried out according to a spectrum spread communication system;

a plurality of said controlled sides are controlled by said control side;

a specified one of said controlled sides, including a receiver section for receiving the rotational drive control signal from said control side by radio receiving and a relay transmission section for relaying a received control signal to an other of said controlled sides;

the other controlled side including a relay receiver section for receiving the rotational, drive control signal through said relax transmitter section said specified controlled side;

said transmitter section on said control, side carrying out radio transmission of the rotational drive control signal to said receiver section on said specified controlled side; and said specified controlled side carrying out relay radio transmission of the rotational drive control signal receiver from said control side through said relay transmission section to said relay receiver section on the other controlled side.

2. A rotational drive control system as defined in claim 1, wherein the plurality of said controlled sides including a plurality of said variable speed drive motors are controlled by said control side.

3. A rotational drive control system as defined in claim 2, comprising:

a specified one of said controlled sides including a receiver section for receiving the rotational drive control signal from said control side by radio receiving and a relay transmission section for relaying a received control signal to an other said controlled sides;

the other controlled side including a relay receiver section for receiving the rotational drive control signal through said relay transmitter section on said specified controlled side;

said transmitter section on said control side carrying out radio transmission of the rotational drive control signal to said receiver section on said specified controlled side;

said specified controlled side carrying out relay radio transmission of the rotational drive control signal receiver from said control side through said relay transmission section to said relay receiver section on the other controlled side.

4. A rotational drive control device as defined in claim 3, wherein said relay transmitter section on said specified controlled side includes an external input terminal to which an external control signal directly related to the other controlled side is input.

5. A rotational drive control device as defined in any one of claims 1, 2 and 3, wherein said rotational drive control signal contains an external control signal directly related to said controlled side.

6. A rotational drive control device as defined in any one of claims 1, 2 and 3, wherein said spectrum spread communication system is a spectrum spread frequency hopping system.

7. A rotational drive control device as defined in claim 5, wherein said spectrum spread communication system is a spectrum spread frequency hopping system.

* * * * *